May 13, 1941. B. I. BUCK 2,241,977
BEAN GRADER
Filed Nov. 30, 1938 6 Sheets-Sheet 1
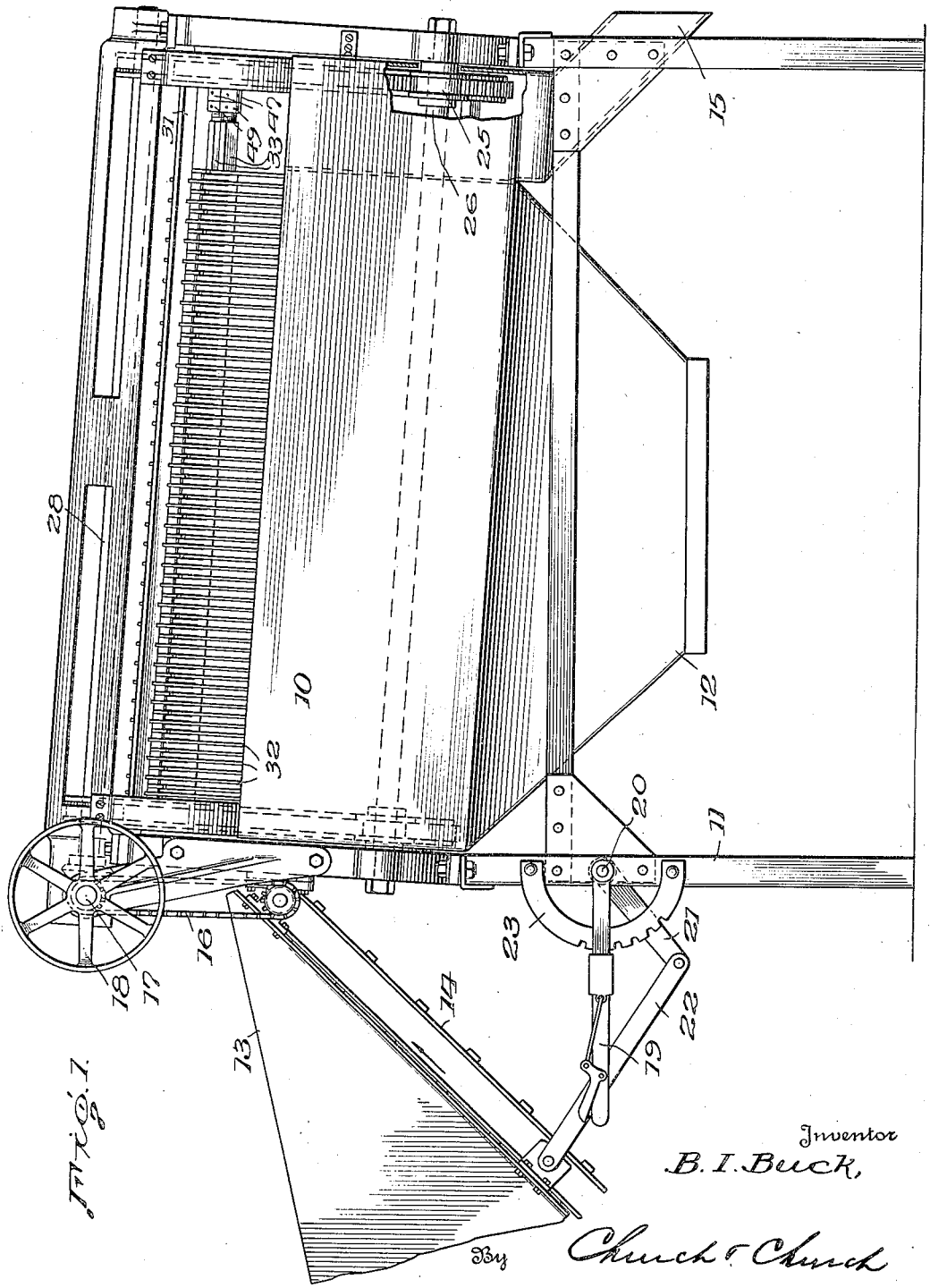
Inventor
B. I. Buck,
By Church & Church
His Attorneys

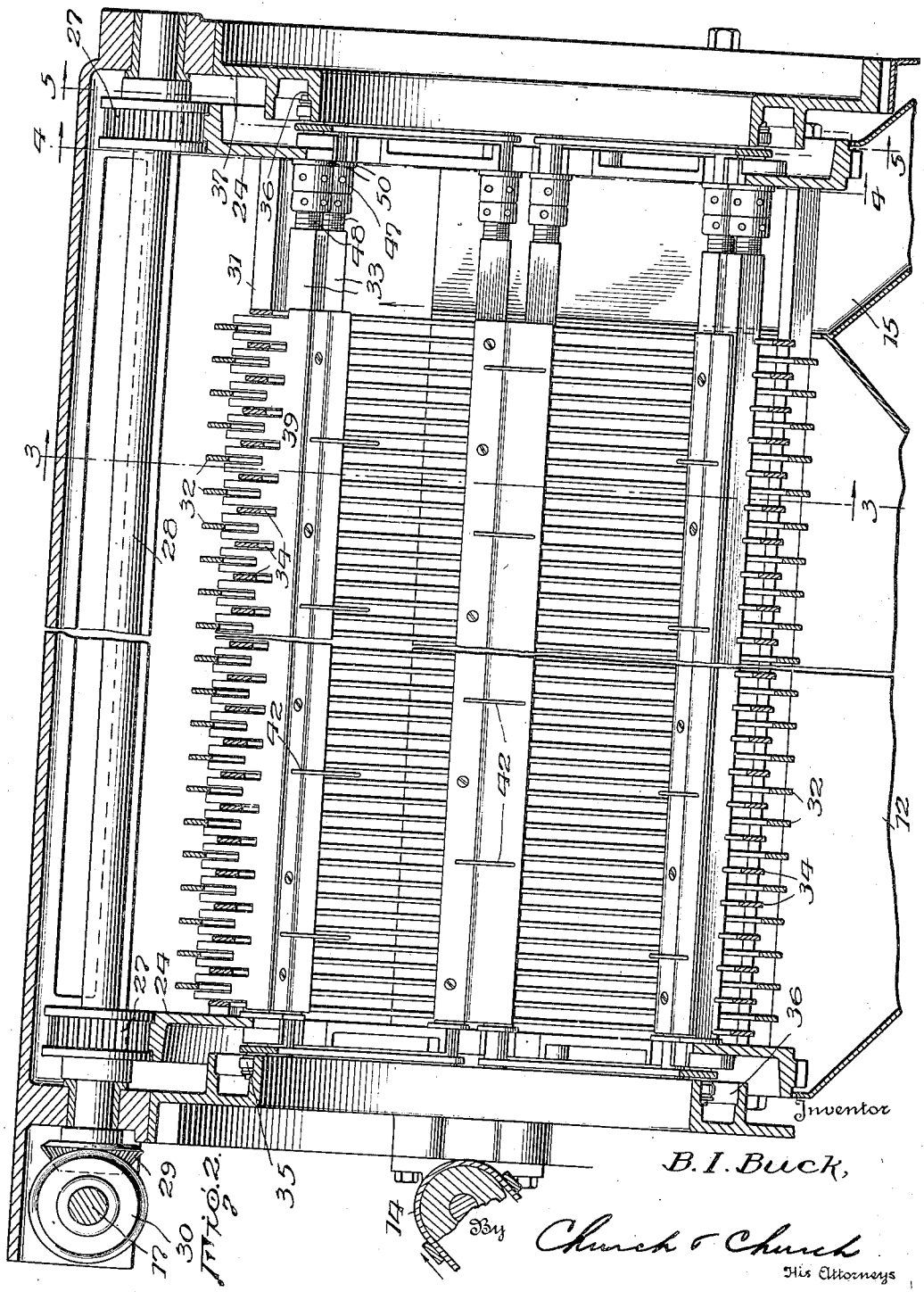

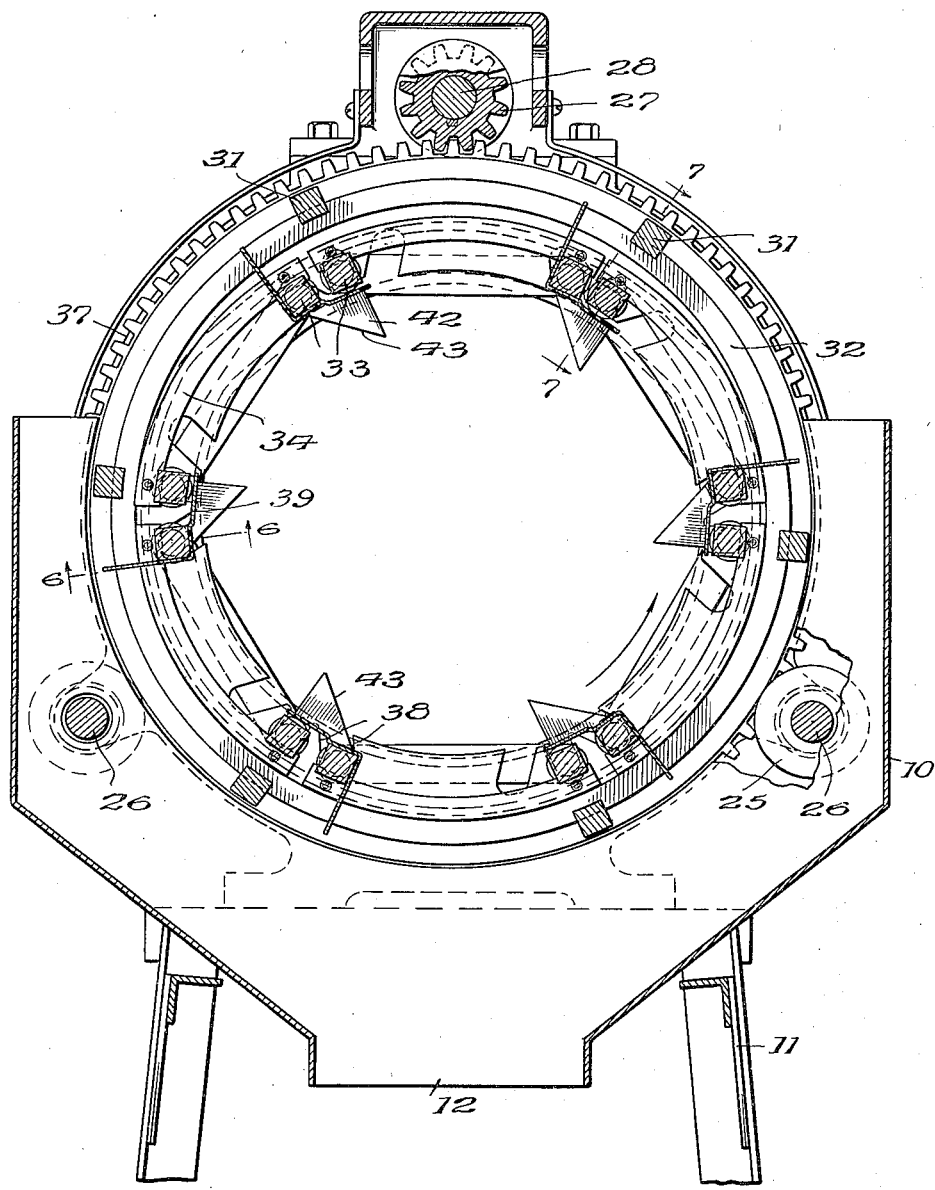

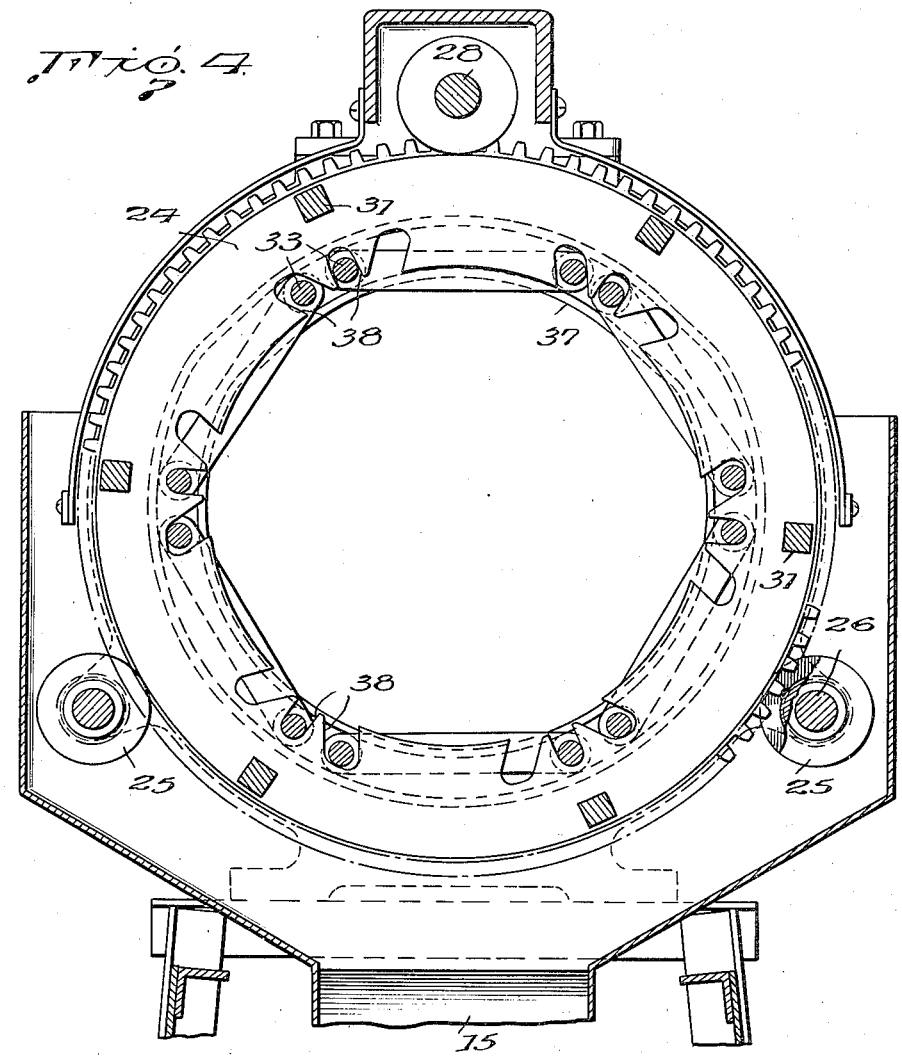
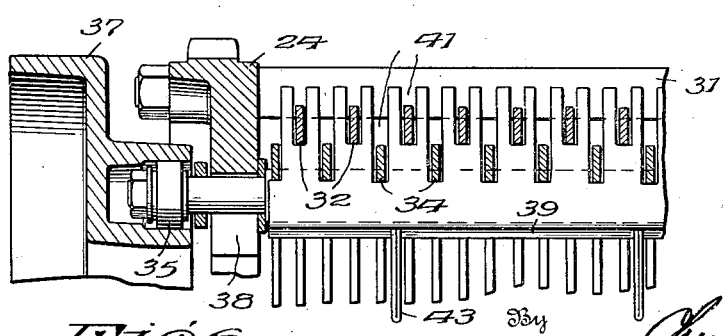

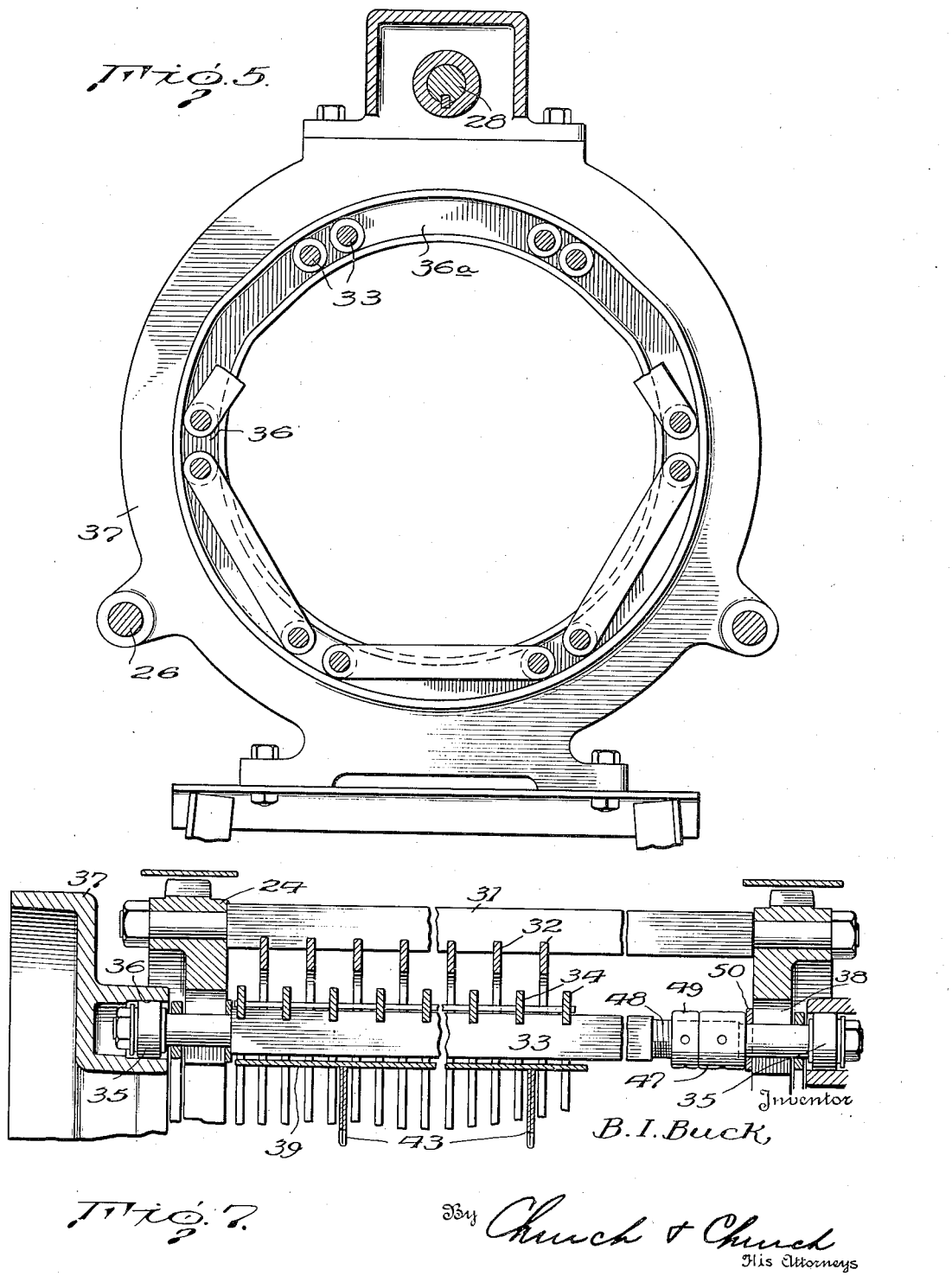

May 13, 1941.  B. I. BUCK  2,241,977
BEAN GRADER
Filed Nov. 30, 1938  6 Sheets-Sheet 6

Inventor
B. I. Buck,
By Church & Church
His Attorneys

Patented May 13, 1941

2,241,977

UNITED STATES PATENT OFFICE 2,241,977

BEAN GRADER

Benjamin I. Buck, Baltimore, Md.

Application November 30, 1938, Serial No. 243,242

18 Claims. (Cl. 209—98)

This invention relates to bean-grading machines and, particularly, to a machine for grading string beans according to their size or thickness.

One object of the invention is to provide a bean-grading machine that will operate with maximum efficiency.

Another object of the invention is to provide a bean-grading machine capable of operating with increased efficiency by reason of the fact that the lodging of beans in the grading devices is positively eliminated.

A still further object of the invention is to provide a bean-grading machine having a series of rings arranged in cylindrical formation and between which beans of smaller size are discharged from the interior of such cylinder, a portion of these grading rings being formed of a number of sections movable radially of the cylinder, whereby clogging of the spaces between the rings by beans lodging therein is prevented.

Another object of the invention is to provide a bean grader wherein the smaller beans pass radially between cylindrically arranged rings, depending upon the spacing of the rings and the size of the beans, the innermost rings being made of a plurality of sections and with said sections carried on bars movable radially of the cylindrically arranged rings, whereby segments of these sectional rings may be successively moved radially of the cylinder to dislodge beans that may tend to clog the spaces between the rings.

A still further object of the invention is to provide means for readily adjusting the rings relatively to each other to compensate for wear on the rods by which such rings are supported or carried.

Another object is to provide means for alining the beans or arranging them substantially parallel with the spaces between the grader rings thus preventing the beans maintaining a position transversely of the rings under which circumstances they might slide axially through the grader to the discharge end thereof regardless of their cross-sectional size.

With these and other objects in view, the invention consists in certain details of construction and combinations and arrangements of parts, all as will hereinafter be more fully described, and the novel features thereof particularly pointed out in the appended claims.

In the accompanying drawings—

Figure 1 is a side elevational view of a bean-grading machine, illustrating the preferred embodiment of the present invention;

Fig. 2 is a vertical sectional view taken longitudinally of the cylindrically arranged bean-grading rings and the supporting structure therefor;

Fig. 3 is a transverse vertical sectional view on the line 3—3 of Fig. 2;

Fig. 4 is a similar view on the line 4—4 of Fig. 2;

Fig. 5 is a like view on the line 5—5 of Fig. 2;

Fig. 6 is a detailed sectional view on the line 6—6 of Fig. 3;

Fig. 7 is a similar view on the line 7—7 of Fig. 3;

Figure 8:
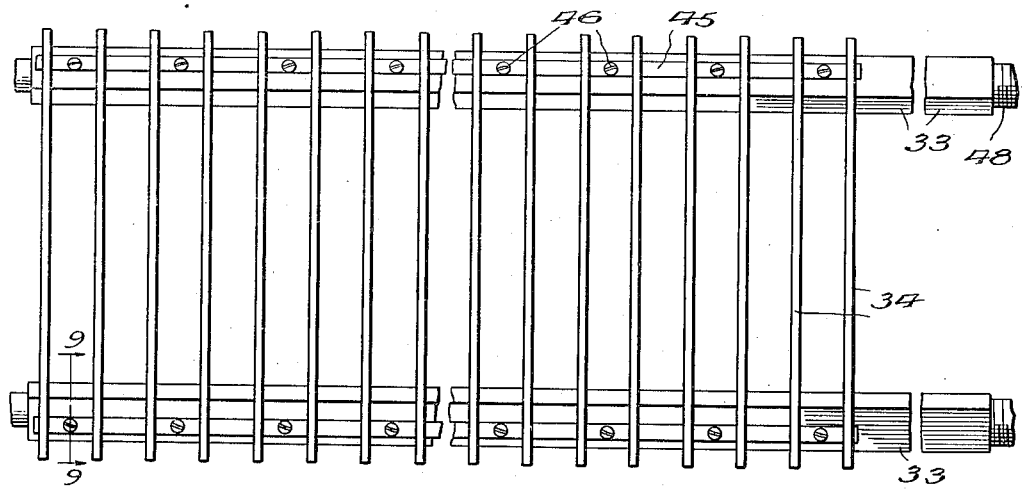
Fig. 8 is a detail plan view illustrating the segmental construction of certain of the grading rings.

Described generally, the machine illustrated in the present instance comprises a series of axially spaced bean-grading rings arranged in cylindrical formation within a casing or housing 10 supported on a frame 11 and provided at its lower wall with a discharge passage 12 from which the smaller beans which pass between juxtaposed grading rings are discharged. At one end of the frame there is pivoted a hopper 13 from which the beans are fed by a traveling belt 14 to the interior of the cylindrical space defined by the grading rings and, at the opposite end of the frame, there is a second discharge passage 15 for the larger beans, or those beans which are too large to pass between juxtaposed grading rings and which fall from the discharge end of the cylindrically arranged rings. The traveling belt 14 is driven by a sprocket chain 16 from a shaft 17 on which there is mounted a drive pulley 18. The angular disposition of the hopper 13 may be varied by means of a hand lever 19 on a shaft 20, said shaft having an arm 21 mounted thereon connected by a link 22 to said hopper. The lever 19 may be maintained in any desired position by means of a detent engaging in one of a series of recesses of a quadrant 23 and, as will be apparent, raising or lowering of the lever will likewise alter the position of the hopper.

At each end of the frame, there is an annular end plate 24 rotatably supported on rollers 25 journaled on shafts 26 and the peripheries of these end members 24 are formed with gear teeth meshing with gears 27 on a shaft 28 journaled in the upper portion of the frame. At one end, said shaft is provided with a beveled pinion 29 meshing with a similar pinion 30 on shaft 17 whereby rotary motion is imparted to shaft 28 and, consequently, the end members 24.

Fixed in these rotatable end members are a plurality of longitudinally extending ring-supporting bars or rods 31, each recessed along its inner edge whereby the grading rings 32 may be fixedly secured in said rods. Also carried by these rotatable end members, but slidable radially thereof, is a second set of grading ring supporting rods 33, spaced radially inward with respect to the rods 31 and formed on their outer edges with recesses for attachment of grading rings 34. The radial spacing of the bars 31 and 33 is preferably such that the outer edges of the grading rings 34 lie substantially in the same plane as the inner edges of the grading rings 32 but, as is more clearly illustrated in Figs. 6 and 7, the spacing of these rings lengthwise of their respective bars or rods is such that the rings of one bar are located in radial planes intermediate juxtaposed rings on the other rod. Thus, it might be said that the distance between contiguous rings on the two bars will determine the maximum size of beans capable of being discharged radially from the cylinder which is formed by the several rings into the discharge passage 12.

In order to increase the efficiency of the machine, it is essential that it be impossible for beans to clog the spaces between these grading rings. For this purpose, one of the sets of rings, that is, the group of rings carried by one of the sets of rods 31, 33, is so constructed that at least portions thereof may be moved radially relatively to the other set or group of rings for the purpose of dislodging beans that may perhaps tend to stick between adjacent ring members. In the present instance, the rings 34 are made of a plurality of sections, usually of arcuate formation. For instance, as illustrated more particularly in Figs. 3 and 4, each ring 34 comprises six segments carried on bars 33, with the ends of each bar slidably received in the recesses in the rotatable end members 24. By moving these bars 33 radially, the segments will likewise be moved to dislodge beans from between the rings. The bars 31, 33, and the rings carried thereby, are shown in their normal relative positions in Fig. 6, while in Fig. 7, they are shown in their more widely spaced positions. Preferably, the bars 33 are provided at their ends with cam rollers 35 running in cam-ways 36 in annular members 37 fixedly mounted in the frame of the machine. The preferred arrangement is illustrated in Fig. 5, wherein the cam-way 36 is substantially circular for the greater portion of its circumference but, as will be noticed, the upper portion, indicated at 36a, is arranged eccentrically, or flattened somewhat, with the result that, as the cam rollers pass over these upper, or flattened, portions of the ways, the supporting rods 33 and the segmental portions of the rings 34 carried thereby will be lowered or moved radially inward, thus freeing beans that may have lodged therein, while those particular segments were traveling through the lower portion of the revolution of the individual ring. In other words, the several segments or sections of each individual ring 34 will be successively moved radially inward with respect to the rings 32 during the upper portion of each revolution of the individual ring. As shown more particularly in Fig. 4, the annular end members 24 are slotted as at 38 for reception of the rods 33, so that said rods are capable of a limited radial motion under the influence of the cam and cam-ways, as the cam rollers travel around the cam-ways 36 in the fixed end members 37.

It will be observed, particularly in Fig. 2, that the several supporting rods 31, 33, are inclined longitudinally of the frame toward the discharge 15. With the two sets of rings arranged in cylindrical formation, beans deposited in the cylinder from the feed belt 14 will be graded, in the sense that all beans too large to pass between contiguous rings will be discharged axially of the cylinder into the discharge 15, while all beans small enough to pass radially between two juxtaposed rings will be fed through the cylinder and discharged from the lower end thereof into the discharge passage 12.

Figure 11:
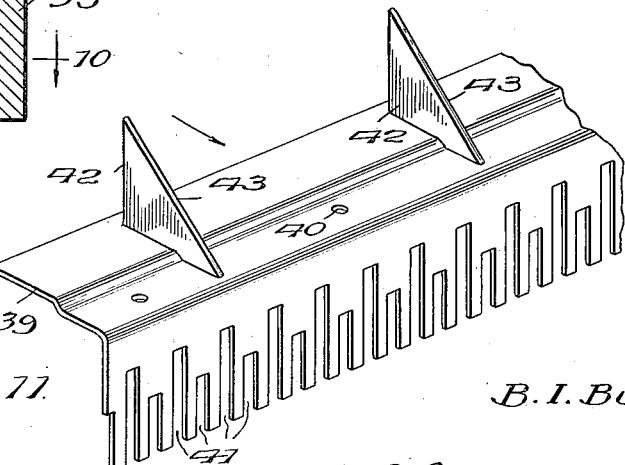
Fig. 11 is a detail perspective view of one of the closure plates for the space between adjacent supporting rods by which the segments of the sectional grading rings are carried.

Due to the sectional formation of the rings 34, there would normally be open spaces between the ends of contiguous ring sections, these spaces extending longitudinally of the cylinder. Consequently, closure plates 39 are provided for these openings. A portion of one of these plates is illustrated in Fig. 11, each plate being provided with openings 40 for fastening elements such as screws and also with slots 41 for accommodation of the two sets of grading rings. For the purpose of preventing beans passing endwise through the grader, means are provided for agitating and arranging them substantially parallel to the grading rings and spaces as they pass through the grader. Preferably such means consist of blades or plates 42 projecting radially into the interior of the rings. The forward or leading edges 43 of the plates or blades may be inclined, so that, as the blades pass through the mass of beans, the tendency will be for any beans that are disposed lengthwise of the cylinder or transversely of the rings and plates to ride up the inclined faces of the blades and tumble off along lines parallel to the spaces between the rings. Thus it is impossible for beans to advance endwise through the grader to the discharge end of the same, unless they are too large to pass between the rings. In other words, those beans small enough to pass between the rings will, at some point, be sure to be turned lengthwise of the spaces between the rings so as to fall through one of said spaces.

Figure 9:
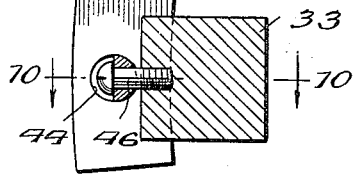
Fig. 9 is a sectional view on the line 9—9 of Fig. 8.
Figure 10:
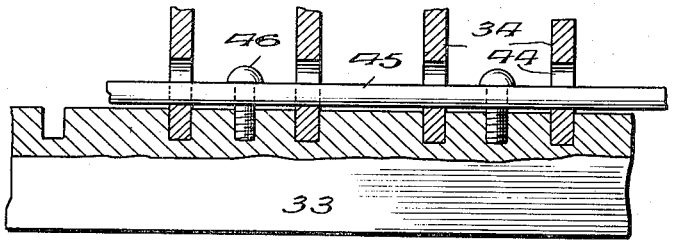
Fig. 10 is a sectional view on the line 10—10 of Fig. 9.

The specific arrangement for mounting the sectional grading rings is more fully shown in Figs. 8 to 10. The segments are provided with apertures 44 for a retaining bar 45, the openings preferably being circular and the bars semi-circular in cross-section. These bars are secured to the rods 33 by lag screws 46 and, as will be apparent, once the segments of the ring are firmly seated by the retaining bar 45 in the recesses in the rod 33, they will not only be securely held in place, but will be fixedly mounted in proper spaced relation with respect to one another.

To maintain proper spacing of the rings 34 with respect to the rings 32, it is necessary that the supporting rods 33 have very little longitudinal play and, consequently, there is a tendency of these bars becoming loose by reason of the wear imposed thereon in the operation of the machine. For these reasons, the bars 33 are made adjustable, as more particularly illustrated in Figs. 2 and 7, wherein each bar is shown as comprising two sections with one section carrying an interiorly threaded socket member 47 adapted to receive the threaded end 48 of the other rod section, whereby the over-all length of the rod may be increased by relative rotary motion of the parts 47, 48, to back the threaded section 48 out of the socket 47 any desired distance. To prevent accidental relative rotation of these parts, a locking nut 49 should also be provided on the threaded end portion 48. To minimize the number of adjustments that might have to be made of the individual rods 33, washers 50 may, if desired, be interposed between the rod and the annular rotating members 24. In other words, these washers will initially take up a portion of the wear, but after the wear on the washers has become excessive so as to materially effect the spacing of the rings 34 with respect to the rings 32, adjustment of the rod sections themselves may then be relied upon for further compensation for wear.

What is claimed is:

1. In a bean grader, a plurality of axially spaced ring-like members, the alternate members being of sectional construction, means for rotating said members, and means for moving successive sections of each of said alternate members to shift the same inwardly and outwardly with respect to the remaining members.

2. In a bean grader, a series of concentrically arranged, axially spaced annular members, a second series of members positioned in planes intermediate contiguous members of the first series, means for rotating all of said members about a common axis, and means for moving successive portions of each of the members of one series to shift the same relatively to said axis and to the members of the other series.

3. In a bean grader, a plurality of, axially spaced ring members with alternate members of less cross-sectional dimension than the other members, means for revolving all of said members about a common axis, and means for collapsing successive portions of those members of smaller dimension.

4. In a bean grader, a plurality of axially spaced ring members with alternate members of less cross-sectional dimension than the others, the members of smaller dimension comprising movable segments whereby portions of said smaller members can be moved relatively to the other members and means for rotating all of said members about a common axis.

5. In a bean grader, a substantially cylindrical container formed of a plurality of axially spaced ring members of different cross-sectional dimensions, all of said members being rotatable about a common axis, the members of smaller dimension being formed of a plurality of segmental sections, the sections of each member being individually movable toward and from said axis, and means for rotating said ring members.

6. In a bean grader, a cylindrical container formed of a plurality of axially spaced ring members of different cross-sectional dimensions, the members of smaller size being formed of segmental sections, rods extending through both ends of corresponding sections of the several members, means for reciprocating said rods inwardly and outwardly of the cylinder, and means for rotating all of said members.

7. In a bean grader, a plurality of axially spaced ring members, a second group of sectional ring members of smaller cross-sectional dimension with the members of said group located intermediate the first-mentioned members, said sectional members each being formed of a plurality of links, rods on which each of said links are supported at their opposite ends, and means for moving said rods and links inwardly and outwardly with respect to the first-mentioned members.

8. In a bean grader, a plurality of axially spaced ring members, a second group of sectional ring members of smaller cross-sectional dimension with the members of said group located in intermediate the first-mentioned members, said sectional members each being formed of a plurality of links, rods on which each of said links are supported at their opposite ends, cam rollers on said rods, fixed cam-ways for said rollers, and means for revolving all of said ring members.

9. In a bean grader comprising a plurality of axially spaced ring-like members of different cross-sectional dimensions, the members of smaller size, being formed of sections arranged end to end in substantially circular formation, supporting rods extending through both ends of the sections of the several members, cover plates for the spaces between the juxtaposed ends of the sections, means for reciprocating said rods inwardly and outwardly with respect to the members of larger size, and means for rotating said members.

10. In a bean grader comprising a plurality of axially spaced ring-like members of different diameters, the members of smaller diameter being formed of sections arranged end to end in substantially circular formation, supporting rods extending through the section of the several members, cover plates for the spaces between the juxtaposed ends of the sections, agitators carried by said cover plates, means for reciprocating said rods radially of the members, and means for rotating said members.

11. In a bean grader, the combination of annular end members, means for rotating said members, rods interposed between said members and slidable radially thereof, a series of sectional grading rings with the sections of the respective rings supported at opposite ends on said rods, and additional rings of larger diameter rotatable with said end members, said larger rings being disposed in radial planes intermediate said smaller, sectional rings.

12. In a bean grader, the combination of annular end members, means for rotating said members, rods interposed between said members and slidable radially thereof, a series of sectional grading rings with the sections of the respective rings supported at their opposite ends on said rods, means for varying the length of said rods, and additional larger rings rotatable with said end members, said larger rings being disposed in radial planes intermediate said smaller, sectional rings on all of said rings being revolvable about a common axis.

13. In a bean grader, a pair of annular, rotatable end members, a series of grading ring supporting rods fixed in said members, grading rings supported by said rods, a second series of ring-supporting rods carried by said end members and slidable radially thereof, and a plurality of sectional grader rings with the individual sections mounted on said slidable rods.

14. In a bean grader, a pair of annular, rotatable end members, a series of grading ring supporting rods fixed in said members, grading rings supported by said rods, a second series of ring-supporting rods carried by said end members and slidable radially thereof, a plurality of sectional grader rings with the individual sections mounted on said slidable rods, said sections being disposed intermediate juxtaposed rings of the first-mentioned grader rings, cam rollers on said slidable rods, and stationary cam-ways in which said rollers engage.

15. In a bean grader, the combination of rotatable end members, grading ring supporting rods interposed between and supported adjacent their ends in said end members, said rods being arranged in pairs spaced circumferentially of the end members, closure plates for the spaces between juxtaposed pairs of rods, agitator blades carried by said plates, grading rings carried by said rods, said blades being disposed substantially parallel to said rings, and means for rotating said end members, rods and rings.

16. In a bean grader, the combination of a series of grading rings arranged in cylinder formation with the rings spaced axially of the cylinder, certain of said rings being formed of circumferentially spaced sections, closures for the spaces between said sections, plates mounted on said closures, said plates being arranged substantially parallel with said rings, and means for rotating all of said rings about a common axis.

17. In a bean grader, the combination of a series of grading rings arranged in cylinder formation with the rings spaced axially of the cylinder, and means on the interior of said cylinder for arranging beans parallel to the spaces between said rings, said means comprising members projecting beyond said rings into said cylinder, said members being disposed parallel to said spaces and in rows circumferentially of the cylinder with the members of contiguous rows arranged in staggered relationship circumferentially of the cylinder.

18. In a bean grader, the combination of a series of rotatable grading rings arranged in cylindrical formation with the rings spaced axially of the cylinder, and members projecting beyond said rings into the interior of said cylinder for arranging the beans parallel to the spaces between said rings, said members being spaced from one another circumferentially of the cylinder and rotatable with said rings, and said cylinder being inclined lengthwise to feed the beans longitudinally of the cylinder between the circumferentially spaced members whereby the leading edges of said members will engage beans fed through the cylinder and turn said beans to position them lengthwise of the spaces between the rings.

BENJAMIN I. BUCK.